United States Patent
Park et al.

(10) Patent No.: US 10,329,408 B2
(45) Date of Patent: Jun. 25, 2019

(54) THERMOPLASTIC RESIN COMPOSITION AND ARTICLE COMPRISING THE SAME

(71) Applicant: Lotte Advanced Materials Co., Ltd., Yeosu-si (KR)

(72) Inventors: Young Ho Park, Uiwang-si (KR); Chan Moo Park, Uiwang-si (KR); Tae Gon Kang, Uiwang-si (KR); Sang Hyun Hong, Uiwang-si (KR)

(73) Assignee: Lotte Advanced Materials Co., Ltd., Yeosu-si (KR)

( * ) Notice: Subject to any disclaimer, the term of this patent is extended or adjusted under 35 U.S.C. 154(b) by 0 days.

(21) Appl. No.: 15/392,123

(22) Filed: Dec. 28, 2016

(65) Prior Publication Data

US 2017/0190882 A1 Jul. 6, 2017

(30) Foreign Application Priority Data

Dec. 31, 2015 (KR) .................. 10-2015-0191455

(51) Int. Cl.
*C08K 7/14* (2006.01)
*C08K 3/22* (2006.01)

(52) U.S. Cl.
CPC .............. *C08K 7/14* (2013.01); *C08K 3/22* (2013.01); *C08K 2003/2241* (2013.01); *C08K 2201/003* (2013.01)

(58) Field of Classification Search
CPC .... C08K 7/14; C08K 3/22; C08K 2003/2241; C08K 2201/003
See application file for complete search history.

(56) References Cited

U.S. PATENT DOCUMENTS

| | | | | |
|---|---|---|---|---|
| 5,849,859 A | * | 12/1998 | Acemoglu | A61K 9/1647 424/278.1 |
| 9,437,790 B2 | | 9/2016 | Kim et al. | |
| 2007/0213458 A1 | * | 9/2007 | Topoulos | C08K 5/005 524/601 |
| 2010/0076137 A1 | * | 3/2010 | Ogasawara | C08L 25/18 524/405 |
| 2012/0329938 A1 | | 12/2012 | Kim et al. | |
| 2014/0167091 A1 | * | 6/2014 | Ogasawara | H01L 33/60 257/98 |
| 2014/0191263 A1 | | 7/2014 | Wang et al. | |
| 2014/0309356 A1 | | 10/2014 | Kim et al. | |
| 2014/0343211 A1 | * | 11/2014 | Nonaka | C03C 13/006 524/433 |
| 2015/0152241 A1 | | 6/2015 | Hong et al. | |
| 2016/0090482 A1 | | 3/2016 | Ebata et al. | |

FOREIGN PATENT DOCUMENTS

| | | | |
|---|---|---|---|
| CN | 102838849 A | 12/2012 | |
| CN | 103589121 A | 2/2014 | |
| CN | 103717673 A | 4/2014 | |
| CN | 104672821 A | 6/2015 | |
| CN | 105209542 A | 12/2015 | |
| EP | 0 246 620 | * 11/1987 | ............ B29C 67/14 |
| JP | 09-040852 A | 2/1997 | |
| KR | 10-2013-0076733 A | 7/2013 | |
| KR | 10-2015-0104185 A | 9/2015 | |
| WO | WO 2013018360 | * 2/2013 | ............ C08L 67/02 |
| WO | WO 2013084895 | * 6/2013 | ............ C03C 13/00 |

OTHER PUBLICATIONS

Office Action in counterpart Korean Application No. 10-2015-0191455 dated Aug. 24, 2017, pp. 1-5.
Office Action in counterpart Chinese Application No. 201611248664.5 dated Jul. 2, 2018, pp. 1-7.
English-translation of Office Action in counterpart Chinese Application No. 201611248664.5 dated Jul. 2, 2018, pp. 1-7.

* cited by examiner

*Primary Examiner* — Alexander C Kollias
(74) *Attorney, Agent, or Firm* — Additon, Higgins & Pendleton, P.A.

(57) ABSTRACT

A thermoplastic resin composition and a molded article produced using the same. The thermoplastic resin composition includes: a polyester resin comprising a repeat unit represented by Formula 1; a white pigment; and glass fillers comprising glass fibers having a circular cross-section and an average sectional diameter of about 6 μm to about 8 μm and flat glass fibers having a sectional aspect ratio of about 1.5 to about 8, wherein a weight ratio of the glass fibers to the flat glass fibers (circular shape:flat shape) ranges from about 1:0.1 to about 1:6,

[Formula 1]

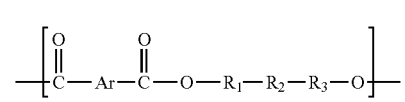

wherein Ar is a $C_6$ to $C_{18}$ arylene group; $R_1$ and $R_3$ are the same or different and are each independently a $C_1$ to $C_{10}$ linear alkylene group; and $R_2$ is a $C_5$ to $C_{12}$ cyclic alkylene group. The thermoplastic resin composition and the molded article produced using the same can exhibit excellent reflectance, impact resistance, stiffness, and balance therebetween.

7 Claims, 1 Drawing Sheet

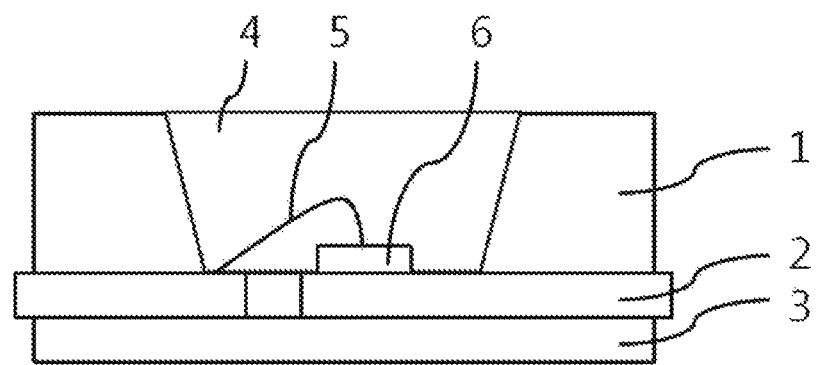

THERMOPLASTIC RESIN COMPOSITION AND ARTICLE COMPRISING THE SAME

CROSS-REFERENCE TO RELATED APPLICATION

This application claims priority under 35 USC Section 119 to and the benefit of Korean Patent Application 10-2015-0191455, filed on Dec. 31, 2015, in the Korean Intellectual Property Office, the entire disclosure of which is incorporated herein by reference.

FIELD

The present invention relates to a thermoplastic resin composition and a molded article produced using the same.

BACKGROUND

Light emitting diodes (LEDs) and organic light emitting diodes (OLEDs) are rapidly emerging as a substitute for conventional light sources due to excellent energy efficiency and long lifespan thereof. Generally, a light emitting diode in combination with components such as a reflector, a reflector cup, a scrambler, and a housing forms a light emitting diode package to maximize light efficiency through high reflectance. Such components must be able to withstand high temperatures and to minimize degradation in reflectivity and degradation in whiteness due to yellowing.

As engineering plastics, polyester resins, copolymers thereof, and blends thereof exhibit useful properties and are thus applied to various fields including interior/exterior materials of products and are also used as a material for the aforementioned components. Particularly, highly heat-resistant polyester resins such as wholly aromatic polyester resins are generally used as a material for the above components. Such a highly heat-resistant polyester resin is not deformed at high temperature and has excellent discoloration resistance, but has a low crystallization rate, low mechanical strength, and low impact resistance.

In order to solve these problems, there has been proposed a method in which additives such as inorganic fillers are mixed with a polyester resin to improve impact resistance and stiffness. However, when additives such as inorganic fillers are used in excess, degradation in moldability, such as bleed-out, can occur.

In addition, in order to obtain a thermoplastic resin composition capable of realizing a high reflectance, the content of a white pigment should be increased. In this case, however, impact resistance of the thermoplastic resin composition can deteriorate due to excessive addition of the white pigment, inorganic fillers and the like.

Therefore, there is a need for a thermoplastic resin composition which does not cause the above problems so as to be used as a material of components for a light emitting diode while exhibiting excellent properties in terms of reflectance, impact resistance, stiffness, and balance therebetween.

SUMMARY OF THE INVENTION

Exemplary embodiments relate to a thermoplastic resin composition which can have excellent properties in terms of reflectance, impact resistance, stiffness, and balance therebetween, and a molded article produced using the same.

The thermoplastic resin composition includes: a polyester resin including a repeat unit represented by the following Formula 1:

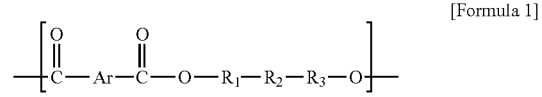

[Formula 1]

wherein Ar is a $C_6$ to $C_{18}$ arylene group; $R_1$ and $R_3$ are the same or different and are each independently a $C_1$ to $C_{10}$ linear alkylene group; and $R_2$ is a $C_5$ to $C_{12}$ cyclic alkylene group; a white pigment; and glass fillers including glass fibers having a circular cross-section and an average sectional diameter of about 6 μm to about 8 μm and flat glass fibers having a sectional aspect ratio of about 1.5 to about 8, wherein a weight ratio of the circular glass fibers to the flat glass fibers ranges from about 1:0.1 to about 1:6.

In exemplary embodiments, the thermoplastic resin composition may include about 100 parts by weight of the polyester resin, about 20 parts by weight to about 90 parts by weight of the white pigment, and about 20 parts by weight to about 60 parts by weight of the glass fillers.

In exemplary embodiments, the polyester resin may include a repeat unit represented by Formula 1a:

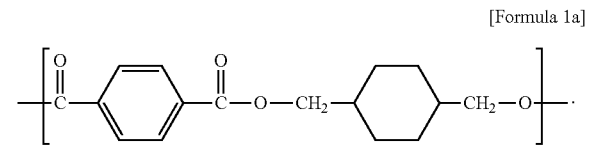

[Formula 1a]

In exemplary embodiments, the white pigment may include at least one selected from among titanium oxide, zinc oxide, zinc sulfide, white lead ($2PbCO_3.Pb(OH)_2$), zinc sulfate, barium sulfate, calcium carbonate, and/or alumina.

In exemplary embodiments, the glass fillers may have an average length of about 200 μm to about 700 μm, as measured after extrusion.

In exemplary embodiments, the thermoplastic resin composition may have a reflectance of about 93% to about 99%, as measured on a specimen having a size of 30 mm×50 mm×2.5 mm at a wavelength of 450 nm in accordance with ASTM E1331.

In exemplary embodiments, the thermoplastic resin composition may have a notched Izod impact strength of about 10 kgf·cm/cm to about 20 kgf·cm/cm, as measured on a ⅛″ thick Izod specimen in accordance with ASTM D256.

In exemplary embodiments, the thermoplastic resin composition may have a tensile strength of about 700 kgf/cm² to about 900 kgf/cm², as measured on a 3.2 mm thick specimen at a tensile speed of 5 mm/min in accordance with ASTM D638.

Exemplary embodiments also relate to a molded article. The molded article is formed of the thermoplastic resin composition as set forth above.

In exemplary embodiments, the molded article may be a reflector or reflector cup for LEDs.

BRIEF DESCRIPTION OF THE DRAWINGS

FIG. 1 is a sectional view of a semiconductor device including a reflector cup formed of a thermoplastic resin composition according to one embodiment of the present invention.

DETAILED DESCRIPTION

The above and other aspects, features, and advantages of the present invention will become apparent from the detailed description of the following embodiments. It should be understood that the present invention is not limited to the following embodiments and may be embodied in different ways, and that the embodiments are provided for complete disclosure and thorough understanding of the present invention by those skilled in the art. The scope of the present invention should be defined only by the appended claims.

A thermoplastic resin composition according to the present invention includes: (A) a polyester resin; (B) a white pigment; and (C) glass fillers including (C1) glass fibers having a circular cross section and (C2) flat glass fibers.

(A) Polyester Resin

The polyester resin can provide excellent properties to the thermoplastic resin composition in terms of, for example, heat resistance, mechanical strength such as stiffness, and impact resistance, even at a high temperature, and may include a repeat unit represent by the following Formula 1:

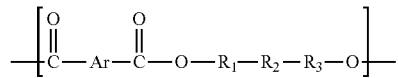

[Formula 1]

wherein Ar is a $C_6$ to $C_{18}$ arylene group; $R_1$ and $R_3$ are the same or different and are each independently a $C_1$ to $C_{10}$ linear alkylene group; and $R_2$ is a $C_5$ to $C_{12}$ cyclic alkylene group.

$R_1$, $R_2$, and $R_3$ are each derived from an alicyclic diol, and the total number of carbon atoms thereof may range from 7 to 22. The polyester resin has a ring-shaped structure in the main chain thereof and thus has a high melting point of, for example, about 200° C. or higher.

In exemplary embodiments, the polyester resin may be prepared by polycondensation of a dicarboxylic acid component including an aromatic dicarboxylic acid and/or a derivative thereof with a diol component including an alicyclic diol.

Examples of the dicarboxylic acid component may include without limitation terephthalic acid, isophthalic acid, 1,2-naphthalene dicarboxylic acid, 1,4-naphthalene dicarboxylic acid, 1,5-naphthalene dicarboxylic acid, 1,6-naphthalene dicarboxylic acid, 1,7-naphthalene dicarboxylic acid, 1,8-naphthalene dicarboxylic acid, 2,3-naphthalene dicarboxylic acid, 2,65-naphthalene dicarboxylic acid, 2,7-naphthalene dicarboxylic acid, and the like. These may be used alone or as a mixture thereof.

In exemplary embodiments, the alicyclic diol may be a $C_7$ to $C_{22}$ alicyclic diol, for example, 1,4-cyclohexanedimethanol (CHDM).

In exemplary embodiments, the polyester resin may be a polycyclohexanedimethylene terephthalate (PCT) resin including a repeat unit represented by the following Formula 1a:

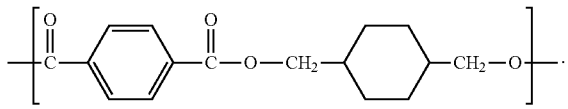

[Formula 1a]

In exemplary embodiments, the polyester resin may have a weight average molecular weight of about 3,000 g/mol to about 200,000 g/mol, for example, about 5,000 g/mol to about 150,000 g/mol, and as another example about 9,000 g/mol to about 13,000 g/mol, as measured in hexafluoroisopropanol (HFIP) by gel permeation chromatography (GPC). Within this range, the thermoplastic resin composition can exhibit excellent processability, impact resistance, and stiffness.

(B) White Pigment

The white pigment according to exemplary embodiments can serve to improve the whiteness, reflectance, discoloration resistance, and light stability of the thermoplastic resin composition in combination with other components and may include any typical white pigment without limitation. Examples of the white pigment may include without limitation titanium oxide, zinc oxide, zinc sulfide, white lead ($2PbCO_3 \cdot Pb(OH)_2$), zinc sulfate, barium sulfate, calcium carbonate, alumina, and the like. These may be used alone or as a mixture thereof In exemplary embodiments, the white pigment may be titanium oxide ($TiO_2$) having a rutile or tetragonal crystal structure.

In exemplary embodiments, the white pigment may have an average particle diameter (d50) of about 0.01 μm to about 2.0 μm, for example, about 0.05 μm to about 0.7 μm. Within this range, the thermoplastic resin composition can exhibit excellent whiteness and reflectance.

In exemplary embodiments, the white pigment may be treated with an organic surface treatment agent and/or an inorganic surface treatment agent. Examples of the organic surface treatment agent may include without limitation a silane coupling agent, polydimethylsiloxane, trimethylpropane (TMP), pentaerythritol, and the like, and combinations thereof. Examples of the silane coupling agent can include without limitation vinyltriethoxysilane, 2-aminopropyltriethoxysilane, and/or 2-glycidoxypropyltriethoxysilane.

Examples of the inorganic surface treatment agent may include without limitation aluminum oxide (alumina, $Al_2O_3$), silicon dioxide (silica, $SiO_2$), zirconium dioxide (zirconia, $ZrO_2$), sodium silicate, sodium aluminate, sodium aluminum silicate, zinc oxide, mica, and the like. These may be used alone or as a mixture thereof.

The organic surface treatment agent and/or the inorganic surface treatment agent may be used in an amount of 5 parts by weight or less based on about 100 parts by weight of the white pigment. Within this range, the thermoplastic resin composition can have further improved whiteness and reflectance.

In exemplary embodiments, the thermoplastic resin composition can include the white pigment in an amount of about 20 parts by weight to about 90 parts by weight, for example, about 30 parts by weight to about 80 parts by weight, based on about 100 parts by weight of the polyester resin. In some embodiments, the thermoplastic resin composition can include the white pigment in an amount of about 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, or 90 parts by weight. Further, according to some embodiments, the amount of the white pigment can be in a range from about any of the foregoing amounts to about any other of the foregoing amounts.

Within this range, the thermoplastic resin composition can have excellent whiteness and reflectance with minimal or no deterioration in impact resistance and stiffness.

(C) Glass Fillers

The glass fillers according to exemplary embodiments can serve to reduce deterioration in impact resistance and stiffness due to increase in the content of the white pigment in the thermoplastic resin composition and may include (C1) glass fibers having a circular cross-section (also referred to herein as the circular glass fibers) and (C2) flat glass fibers.

In exemplary embodiments, the glass fibers having a circular cross-section may have an average cross-sectional diameter of about 6 μm to about 8 μm, for example, about 6 μm to about 7.5 μm, as measured using an optical microscope. If the average cross-sectional diameter of the glass fibers having a circular cross-section is less than about 6 μm, stiffness of the thermoplastic resin composition can deteriorate, whereas, if the average cross-sectional diameter exceeds about 8 μm, the glass fillers can protrude from a surface of a molded article upon molding of the thermoplastic resin composition, thereby causing appearance failure.

In exemplary embodiments, the flat glass fiber (C2) may be any typical flat glass fibers used in a thermoplastic resin composition and may have a cross-sectional aspect ratio of about 1.5 to about 8, for example, about 1.6 to about 5 and a short diameter of about 6 μm to about 12 μm, as measured using an optical microscope. Within this range, surface smoothness and reflectance of the thermoplastic resin composition (and/or a molded article) can be improved.

In exemplary embodiments, the glass fillers (the glass fibers having a circular cross-section (C1) and the flat glass fiber (C2)) may have an average length of about 1 mm to about 5 mm, as measured before extrusion and an average length of about 200 μm to about 700 μm, for example, about 210 μm to about 690 μm, as measured after extrusion. Within this range, the thermoplastic resin composition can exhibit excellent impact resistance and stiffness.

In exemplary embodiments, the glass fillers (C) may be coated with a surface treatment agent to increase bonding strength with the components of the thermoplastic resin composition, such as the polyester resin. Examples of the surface treatment agent that can be used can include without limitation a silane compound, a urethane compound, and/or an epoxy compound.

In exemplary embodiments, a weight ratio of the glass fibers (C1) to the flat glass fiber (C2) (C1:C2) may range from about 1:0.1 to about 1:6, for example, about 1:0.2 to about 1:5. If the weight ratio of the glass fibers to the flat glass fiber (C1:C2) is less than about 1:0.1, reflectance of the thermoplastic resin composition can deteriorate, whereas, if the weight ratio (C1:C2) exceeds about 1:6, impact resistance and stiffness of the thermoplastic resin composition can deteriorate.

In exemplary embodiments, the thermoplastic resin composition can include the glass fillers (C) in an amount of about 20 parts by weight to about 60 parts by weight, for example, about 30 parts by weight to about 50 parts by weight, based on about 100 parts by weight of the polyester resin. In some embodiments, the thermoplastic resin composition can include the glass fillers in an amount of about 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, or 60 parts by weight. Further, according to some embodiments, the amount of the glass fillers can be in a range from about any of the foregoing amounts to about any other of the foregoing amounts.

Within this range, the thermoplastic resin composition can exhibit excellent impact resistance, stiffness, and processability.

The thermoplastic resin composition may further include one or more typical additives without altering the effects of the present invention, depending on applications. Examples of the additives may include without limitation antioxidants, stabilizers, inorganic fillers other than the glass fillers described herein, flame retardants, flame retardant aids, drip inhibitors, nucleating agents, releasing agents, antibacterial agents, surfactants, coupling agents, plasticizers, compatibilizers, lubricants, antistatic agents, UV absorbers, UV screening agents, and the like, and combinations thereof.

Examples of the antioxidants may include without limitation phenol, amine, sulfur, and/or phosphorus antioxidants; examples of the stabilizers (heat stabilizer, light stabilizer) may include without limitation lactone, hydroquinone, halogenated copper, and/or iodine compounds; and examples of the flame retardants may include without limitation bromine, chlorine, phosphorus, antimony, and/or inorganic compounds.

In exemplary embodiments, the thermoplastic resin composition can include the additives in an amount of about 20 parts by weight or less, for example, about 0.1 parts by weight to about 15 parts by weight, based on about 100 parts by weight of the polyester resin. In some embodiments, the thermoplastic resin composition can include the additives in an amount of 0 (the additives are not present), about 0 (one or more additives are present), 0.1, 0.2, 0.3, 0.4, 0.5, 0.6, 0.7, 0.8, 0.9, 1, 2, 3, 4, 5, 6, 7, 8, 9, 10, 11, 12, 13, 14, 15, 16, 17, 18, 19, or 20 parts by weight. Further, according to some embodiments, the amount of the additive(s) can be in a range from about any of the foregoing amounts to about any other of the foregoing amounts.

The thermoplastic resin composition according to the present invention may be prepared by any suitable known method. For example, the above components and, optionally, additive(s) may be mixed using a Henschel mixer, a V blender, a tumbler blender, or a ribbon blender, followed by melt extrusion in a single screw extruder or a twin screw extruder at a temperature of about 150° C. to about 350° C., thereby preparing a thermoplastic resin in pellet form.

In exemplary embodiments, the thermoplastic resin composition may have a reflectance of about 93% or higher, for example, about 93% to about 99%, as measured on a specimen having a size of 30 mm×50 mm×2.5 mm at a wavelength of 450 nm in accordance with ASTM E1331.

In exemplary embodiments, the thermoplastic resin composition may have a notched Izod impact strength of about 10 kgf·cm/cm to about 20 kgf·cm/cm, for example, about 12 kgf·cm/cm to about 20 kgf·cm/cm, as measured on a ⅛" thick Izod specimen in accordance with ASTM D256.

In exemplary embodiments, the thermoplastic resin composition may have a tensile strength of about 700 kgf/cm$^2$ to about 900 kgf/cm$^2$, for example, about 730 kgf/cm$^2$ to about 850 kgf/cm$^2$, as measured on a 3.2 mm thick specimen at a tensile speed of 5 mm/min in accordance with ASTM D638.

Other embodiments relate to a molded article produced using the thermoplastic resin composition as set forth above. The thermoplastic resin composition may be produced into a molded article by any suitable molding method, such as injection molding, double injection molding, blow molding, extrusion, and thermoforming.

The molded article can exhibit excellent properties in terms of reflectance, impact resistance, stiffness, and heat resistance and thus may be applied without limitation in applications wherein the molded article is used to reflect light. For example, the molded article may be used as a reflector for light emitting devices of electric/electronic components, indoor and outdoor luminaires, automobile luminaires, and displays, and can be particularly useful as a reflector or reflector cup for LEDs.

FIG. 1 is a sectional view of a semiconductor device (package) including a reflector cup formed of the thermoplastic resin composition according to embodiments of the invention. Referring to FIG. 1, the thermoplastic resin composition according to embodiments of the invention may be produced into a reflector or reflector cup 1 having various shapes, and the reflector cup 1 may be assembled with an electrode 2, a substrate 3, a sealing resin 4, a wire 5, and a light emitting diode (LED) 6 to form a product including a light emitting diode (LED) or an organic light emitting diode (OLED), such as semiconductor devices or luminaires. It should be understood that various modifications and changes can be made thereto by those skilled in the art.

Next, the present invention will be described in more detail with reference to the following examples. It should be understood that these examples are provided for illustration only and are not to be construed in any way as limiting the present invention.

EXAMPLES

Details of components used in the following Examples and Comparative Examples are as follows:

(A) Polyester Resin

A polycyclohexanedimethylene terephthalate resin (weight average molecular weight: 10,000 g/mol)

(B) White Pigment

Titanium oxide ($TiO_2$)

(C) Glass Fillers (C1) Glass fibers having a circular cross-section (average diameter: 6.5 μm, average length: 3 mm)

(C2) Flat glass fibers (cross-sectional aspect ratio: 4, average cross-sectional size: 7 μm×28 μm, average length: 3 mm)

(C3) Glass fibers having a circular cross-section (average diameter: 10 μm, average length: 3 mm)

(C4) Glass fibers having a circular cross-section (average diameter: 5 μm, average length: 3 mm)

Examples 1 to 3 and Comparative Examples 1 to 4

Preparation and Evaluation of Thermoplastic Resin Composition

The above components are mixed in amounts as listed in Table 1, followed by melt extrusion at 300° C., thereby preparing a thermoplastic resin composition in pellet form. Here, a twin-screw extruder (L/D=36, ϕ=45 mm) is used. The pelletized polycarbonate resin composition is dried at 100° C. for 4 hours, followed by injection molding using a 6 oz. injection machine (molding temperature: 300° C., mold temperature: 130° C.), thereby preparing a specimen for property evaluation. Each of the prepared specimens are evaluated as to reflectance, notched Izod impact strength, and tensile strength according to the following methods. Results are shown in Table 1.

Property Evaluation (1) Reflectance (unit: %): Reflectance (in specular component included (SCI) mode) for light at a wavelength of 450 nm (LED light source) is measured on a specimen having a size of 30 mm×50 mm×2.5 mm in accordance with ASTM E1331. Here, as a reflectance meter, 3600 CIE Lab. available from KONICA MINOLTA HOLDINGS, INC. is used.

(2) Notched Izod impact strength (unit: kgf·cm/cm): Notched Izod impact strength is measured on a ⅛" thick notched Izod specimen in accordance with ASTM D256.

(3) Tensile strength (unit: $kgf/cm^2$): Tensile strength is measured on a 3.2 mm thick specimen at a tensile speed of 5 mm/min in accordance with ASTM D638.

(4) Number of glass fillers per unit sectional area (unit: $EA/mm^2$): The number of glass fillers within a sectional area of 1 $mm^2$ of each of the specimens is observed using a scanning electron microscope (SEM).

TABLE 1

|  |  | Example | | | Comparative Example | | | |
| --- | --- | --- | --- | --- | --- | --- | --- | --- |
|  |  | 1 | 2 | 3 | 1 | 2 | 3 | 4 |
| (A) (parts by weight) | | 100 | 100 | 100 | 100 | 100 | 100 | 100 |
| (B) (parts by weight) | | 60 | 60 | 60 | 60 | 60 | 60 | 60 |
| (C) | (C1) | 6 | 20 | 34 | — | — | 1 | 39 |
| (parts by | (C2) | 34 | 20 | 6 | 20 | 20 | 39 | 1 |
| weight) | (C3) | — | — | — | 20 | — | — | — |
|  | (C4) | — | — | — | — | 20 | — | — |
| Reflectance (%) | | 93.7 | 93.9 | 93.5 | 93.2 | 92.9 | 94.0 | 91.0 |
| Notched Izod impact strength (kgf · cm/cm) | | 12 | 13 | 15 | 11 | 8 | 10 | 16 |
| Tensile strength ($kgf/cm^2$) | | 740 | 780 | 800 | 720 | 650 | 690 | 850 |
| Number of glass fillers per unit sectional area ($EA/mm^2$) | | 3,000 | 3,300 | 3,400 | 3,300 | 3,500 | 2,700 | 3,500 |

From the above results, it can be seen that the thermoplastic resin compositions (Examples 1 to 3) according to the present invention have a larger number of glass fillers per unit sectional area and exhibit excellent properties in terms of reflectance, impact resistance (notched Izod impact strength), stiffness (tensile strength), and balance therebetween.

Conversely, the thermoplastic resin composition (specimen) of Comparative Example 1 in which the glass fibers having a circular cross-section have an average diameter greater than the range of the present invention have appearance failure caused by glass fillers protruding from the surface of the molded article, and overall properties thereof are poorer than those of the thermoplastic resin compositions of Examples including the same amount of glass fillers. In addition, the thermoplastic resin composition (specimen) of Comparative Example 2 in which the glass fibers having a circular cross-section have an average diameter smaller than the range of the present invention exhibit significantly poor properties in terms of stiffness and impact resistance. Further, among the thermoplastic resin compositions (specimens) of Comparative Examples 3 and 4 in which a weight ratio of the glass fibers to the flat glass fibers did not fall within the range of the present invention, the thermoplastic resin composition (specimen) of Comparative Example 3 including an excess of flat glass fibers has a smaller number of glass fillers per unit sectional area and poor stiffness despite improvement in reflectance, and the thermoplastic resin composition (specimen) of Comparative Example 4 including an excess of glass fibers having a circular cross-section exhibit poor reflectance.

Exemplary embodiments have been disclosed herein, and although specific terms are employed, they are to be interpreted in a generic and descriptive sense only and not for purpose of limitation. Also although some embodiments have been described above, it should be understood that these embodiments are provided for illustration only and are not to be construed in any way as limiting the present invention, and that various modifications, changes, and alterations can be made by those skilled in the art without departing from the spirit and scope of the invention. The scope of the present invention should be defined by the appended claims and equivalents thereof

What is claimed is:

1. A thermoplastic resin composition, comprising:
   about 100 parts by weight of a polyester resin comprising a repeat unit represented by Formula 1a and having a weight average molecular weight of about 3000 g/mol to about 200,000 g/mol

[Formula 1a]

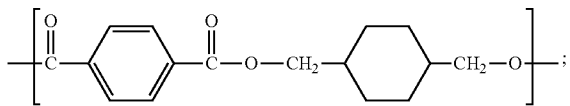

about 40 to about 80 parts by weight of titanium dioxide; and
   about 30 to about 50 parts by weight of glass fillers comprising glass fibers having a circular cross-section and an average sectional diameter of about 6 μm to about 7.5 μm and flat glass fibers having a sectional aspect ratio of about 1.5 to about 8,
   wherein the amount of titanium dioxide and the amount of the glass fillers are based on about 100 parts by weight of the polyester resin,
   wherein a weight ratio of the glass fibers having a circular cross-section to the flat glass fibers ranges from about 6:34 to about 34:6, and
   wherein the thermoplastic resin composition has a reflectance of 93.5% to about 99%, as measured on a specimen having a size of 30 mm×50 mm×2.5 mm at a wavelength of 450 nm in accordance with ASTM E1331, a tensile strength of 740 kgf/cm$^2$ to 800 kgf/cm$^2$, as measured on a 3.2 mm thick specimen at a tensile speed of 5 mm/min in accordance with ASTM D638, and a notched Izod impact strength of 12 kgf cm/cm to 15 kgf cm/cm, as measured on a ⅛" thick Izod specimen in accordance with ASTM D256.

2. The thermoplastic resin composition according to claim 1, wherein the glass fillers have an average length of about 200 μm to about 700 μm, as measured after extrusion.

3. A molded article produced using the thermoplastic resin composition according to claim 1.

4. The molded article according to claim 3, wherein the molded article is a reflector or reflector cup for LEDs.

5. The thermoplastic resin composition according to claim 1, wherein both the glass fibers having a circular cross-section and the flat glass fibers have an average length of about 1 mm to about 5 mm as measured before extrusion of the composition.

6. The thermoplastic resin composition according to claim 1, wherein the polyester resin has a weight average molecular weight of about 5,000 g/mol to about 150,000 g/mol.

7. The thermoplastic resin composition according to claim 1, wherein the polyester resin has a weight average molecular weight of about 9,000 g/mol to about 13,000 g/mol.

* * * * *